(12) United States Patent
Elliott

(10) Patent No.: US 7,011,287 B2
(45) Date of Patent: Mar. 14, 2006

(54) MOTOR VEHICLE PINCH VALVE

(75) Inventor: Martin Elliott, Huntington (GB)

(73) Assignee: The Gates Corporation, Denver, CO (US)

( * ) Notice: Subject to any disclaimer, the term of this patent is extended or adjusted under 35 U.S.C. 154(b) by 46 days.

(21) Appl. No.: 10/805,546

(22) Filed: Mar. 19, 2004

(65) Prior Publication Data

US 2005/0205822 A1   Sep. 22, 2005

(51) Int. Cl.
*F16K 7/04* (2006.01)
(52) U.S. Cl. .................................................. 251/7
(58) Field of Classification Search ............... 251/4, 251/7
See application file for complete search history.

(56) References Cited

U.S. PATENT DOCUMENTS

| | | | | |
|---|---|---|---|---|
| 1,905,335 A | * | 4/1933 | Bijur | 184/7.3 |
| 3,419,997 A | * | 1/1969 | Owbridge | 446/162 |
| 3,511,469 A | | 5/1970 | Bell | 251/7 |
| 3,701,513 A | * | 10/1972 | Carter | 261/18.2 |
| 4,259,985 A | | 4/1981 | Bergmann | 137/595 |
| 4,322,054 A | | 3/1982 | Campbell | 251/5 |
| 4,682,755 A | | 7/1987 | Bernstein et al. | 251/4 |
| 4,911,399 A | * | 3/1990 | Green | 251/6 |
| 5,221,268 A | * | 6/1993 | Barton et al. | 604/250 |
| 5,273,253 A | * | 12/1993 | Rogers | 251/9 |
| 5,297,526 A | | 3/1994 | Braddock | 123/510 |
| 5,975,629 A | * | 11/1999 | Lorbiecki | 297/200 |
| 6,536,739 B1 | * | 3/2003 | Jensen | 251/6 |
| 2002/0097966 A1 | * | 7/2002 | Zelesnik | 385/100 |

* cited by examiner

*Primary Examiner*—J. Casimer Jacyna
(74) *Attorney, Agent, or Firm*—C. H. Castleman, Esq.; J. A. Thurnau, Esq.; P. N. Dunlap

(57) ABSTRACT

A pinch valve for automotive applications, wherein the pinch valve comprises a flexible hose, an extension seat cradling the flexible hose, a pinching extension aligned opposite the extension seat on the outside of the flexible hose, and a valve actuator that is operatively coupled to the pinching extension. The valve actuator may be disposed to position the pinching extension in response to predetermined factors or in response to a control system, such as a vehicle's computer.

15 Claims, 3 Drawing Sheets

MOTOR VEHICLE PINCH VALVE

TECHNICAL FIELD

This invention relates to the field of pinch valves, more particularly, this invention relates to an electric pinch valve to be used for automotive or other motor vehicle applications; the pinch valve being disposed to be controlled by an automobile's computer system to open and close in response to predetermined input factors such as temperature and pressure.

BACKGROUND OF THE INVENTION

Automobiles and other motorized vehicles typically have numerous valves associated with them. These valves may range in application from fuel systems to cooling systems to braking systems, just to name a few. Historically, these valves have been intrusive in nature, meaning that the valving mechanism or gate directly interacts with the material, typically fluid, that it is trying to control the flow of. These prior art valves therefore have inherent problems, as the valving mechanism is more susceptible to increased wear and corrosion due to direct contact with the flow material. Additionally, these prior art valves are typically located within the flow path of a system, and therefore disrupt the flow, even in an open position. Also, mechanical valves typically have the valve mechanism or gate located within the material flow path, but then have the attached control mechanism for the valve located outside the material flow path, thereby creating a potential path for leakage.

U.S. Pat. No. 5,297,526 to Braddock discloses a glow plug engine that comprises a pinch valve. The control member of the pinching mechanism of this pinch valve may be a cam means pivotally mounted with respect to the valve body and having a surface that is extendible toward and retractable from the conduit section held captive within the valve body. This pinch valve may further include a lever means connected to one end of the cam means, and connected to its free end to a servomechanism of a radio controlled model airplane. However, since this valve contemplates being manually controlled through the use of a servomechanism, it would not be feasible for automotive applications.

U.S. Pat. No. 3,511,469 to Bell discloses a solenoid operated valve. This valve has diametrically opposed solenoids, each having an armature plunger that is movable towards and away from a flexible tube, that when extended laterally, can close off the tube passage. The solenoids create an automatic-type valve system, however the requirement for two solenoids makes for a complicated valve system. This complication may cause increased manufacturing costs, increased maintenance/repair costs, or possibly a greater likelihood of malfunction as failure of either solenoid might lead to insufficient valve operation.

SUMMARY OF THE INVENTION

Accordingly, it is an aspect of this invention to provide a pinch valve for automotive and other motorized vehicles applications, where the pinch valve comprises a flexible hose, an extension seat cradling the flexible hose, a pinching extension aligned opposite the extension seat on the outside of the flexible hose, and a valve actuator that is operatively coupled to the pinching extension.

It is still another aspect of this invention to provide a pinch valve that further comprises a single valve actuator to move the pinching extension in order to reduce manufacturing and maintenance costs and to also meet vehicular space constraints.

It is a further aspect of this invention to provide a pinch valve that has a valve actuator disposed to position the pinching extension in response to predetermined factors.

It is another aspect of this invention to provide a pinch valve that has a valve actuator disposed to position the pinching extension in response to a control system, such as a vehicle's computer.

The above and other features and advantages of the invention will be apparent in the following detailed description.

DISCLOSURE OF A PREFERRED EMBODIMENT OF THE INVENTION

Figure 1:
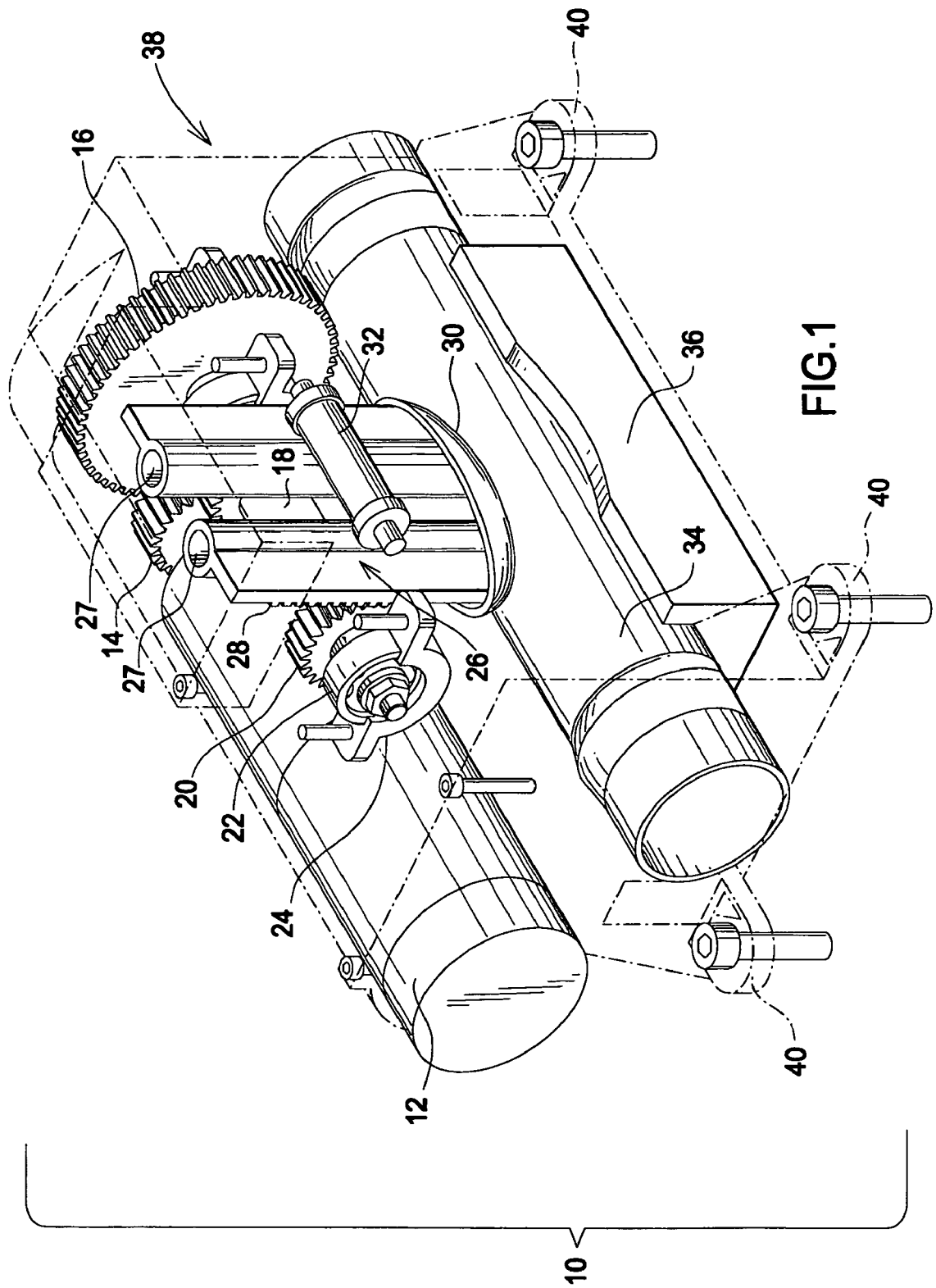
FIG. 1 is a partial cutaway perspective view of the preferred embodiment of the pinch valve of the present invention.
Figure 2:
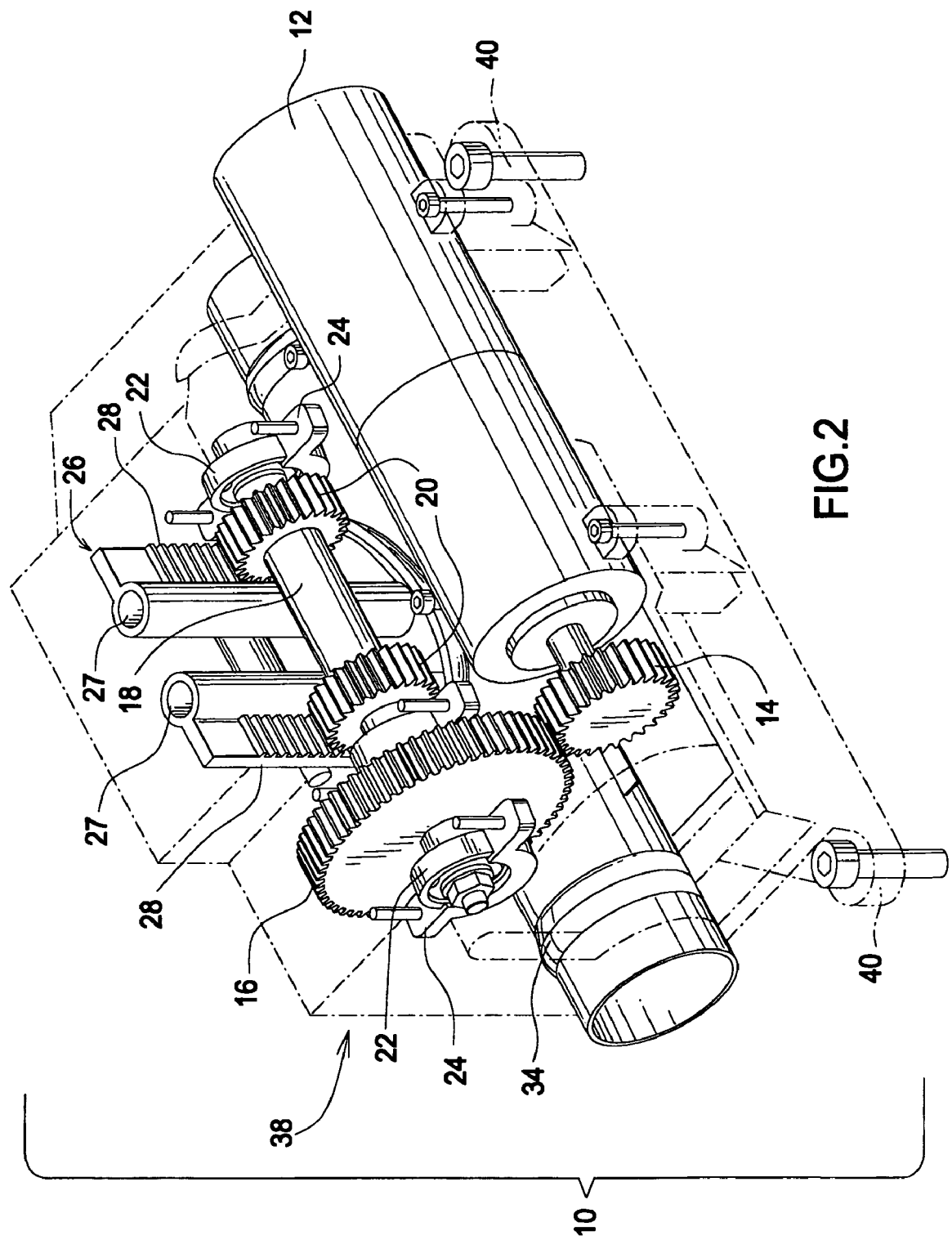
FIG. 2 is a partial cutaway perspective view of the preferred embodiment of the pinch valve of the present invention, looking from the opposite direction of FIG. 1.

Referring to FIG. 1 and FIG. 2, the preferred embodiment of a pinch valve of the present invention will now be described. The pinch valve (shown generally at 10) comprises a valve actuator 12. The valve actuator 12 may be from a group generally referred to as automatic actuators, which includes, but is not limited to, an electric motor, a solenoid, a hydraulic system, or the combination of two or more of the foregoing. The valve actuator 12 is preferably responsive to a control system such as a vehicle's computer system (not shown), or another automated input system, which monitors the system to which the pinch valve 10 is connected to, and then instructs the valve actuator 12 to open or close in accordance with predetermined factors. It is contemplated that a control system may be incorporated into the structure of the valve actuator 12, thereby eliminating the need for separate structures.

The valve actuator 12 may utilize an actuator gear 14 to interact with and control the valve actions. Actuator gear 14 meshedly engages a gear wheel 16, which is connected to a gear axle 18. The gear axle 18 may be situated between two bearings 22, which are seated in bearing seats 24, which allow the gear axle 18 to rotate more freely upon direction by the valve actuator 12. The gear axle 18 further comprises a pair of secondary gears 20 that meshedly engage the pinching extension 26. More specifically, the secondary gears 20 mesh with the gear interface 28 of the pinching extension 26.

The pinching extension 26 is constricted in its movements by the positioning of the secondary gears 20 on one side, a guide roller 32 on the other, as well as guide trackers 27 which follow tracks (not shown for clarity) that extend into the pinching extension 26. The guide tracks are preferably mounted on the interior of the housing 38 to provided stability to the track alignment. In this manner, the pinching extension 26 is typically restricted to a planar movement that is generally perpendicular to the flow of materials through the associated flexible tube 34.

The pinching extension 26 further comprises an extension head 30, which is formed to properly mate with the extension seat 36 and pinch off the flow of materials through the flexible tube 34. It is preferred that the extension head 30 and the extension seat 36 be formed to comprise generally curved surfaces so as to prevent any sharp edges from coming into contact with the flexible tube 34 during pinching movements, thereby reducing the possibility of breaching or damaging the flexible tube 34. The extension seat 36 should generally match the shape of the extension head 30, but be larger in size so as to accommodate the wall thickness of the flexible tube as it is compressed or "pinched."

The flexible hose 34 may be comprised of any suitable material or combinations of materials with sufficient elasticity to withstand numerous compressions. Typically the flexible hose 34 will comprise elastomeric tube and cover materials of the same or different materials sandwiching an embedded textile or wire reinforcement in the form of a braid, spiral, knit or wrap telescoped over the tube. It is preferable that the hose composite have sufficient "memory" so as to return to a "full flow" position upon opening of the pinch valve. It is contemplated that EPDM (ethylene propylene diene monomer) will work sufficiently, although any rubber or other flexible hose material or combination of materials or reinforcement is also contemplated. Additional considerations should be given to the material that will flow through the pinch valve, as reactivity to the material, pressure, temperature, and other fluid mechanics requirements should be evaluated in choosing a proper hose material.

The pinch valve 10 is preferably placed in a housing 38 to prevent contaminants from entering the system, and to prevent any leakage from escaping the system. The housing 38 may be configured to be removable, to allow for maintenance, or may be sealed to prevent tampering. The housing 38 is preferably comprised of a rigid material such as metal or lightweight materials such as plastic, rubber, or polyamide 66 with fiberglass reinforcement. Any rigid material is contemplated as being able to be utilized for the housing 38. It is also preferable that the housing have mounts 40 so that the pinch valve 10 may be mounted and maintain a fixed position in relation to the system that it is attached to.

In operation, the valve actuator 12 receives a directive from a control system such as an automated input sensor or a vehicle's computer (which may in turn be linked to an input sensor), to open, close, or partially open or close the pinch valve 10. Typically, this directive is a predetermined response derived from comparing a preset control directory to system conditions, such as pressure, temperature, flow, etc., and thereby deriving a proper response (i.e. open, close, partially open or close, or continue the current position). The valve actuator 12 then rotates the actuator gear 14 a predetermined direction and rotative amount (i.e. partially rotate or fully rotate), depending on the directive. The actuator gear 14 meshedly engages the gear wheel 16 and rotates it accordingly, which through its connection to the gear axle 18, rotates the secondary gears 20. The secondary gears 20 meshedly engage the gear interface rack 28 of the pinching extension 26, and move it vertically to the corresponding position that causes the extension head 30 to either open, close, or partially open or close the hose passage way as it impinges the flexible hose 34 cradled within extension seat 36. The valve actuator 12 or the control system that sends directives to the valve actuator 12 may alone or jointly be configured to move the valve to a default position, for example fully open, in instances of a power failure or other emergency situations. This practice of using default settings will help prevent critical situations from arising due to failures of systems associated with the pinch valve.

In the foregoing embodiment, the valve actuator 12 controls the pinching extension 26 through an assortment of gears. However, it is contemplated that this control can be accomplished by numerous other known methods, such as through the use of belts, chains, or even direct linkages, without departing from the scope of this invention. Additionally, it is contemplated that the valve actuator 12 may engage the pinching extension 26 directly, without the need for the gear axle 18 and its associated gears, or may incorporate more than one gear axle to control the pinching extension 26.

Figure 3:
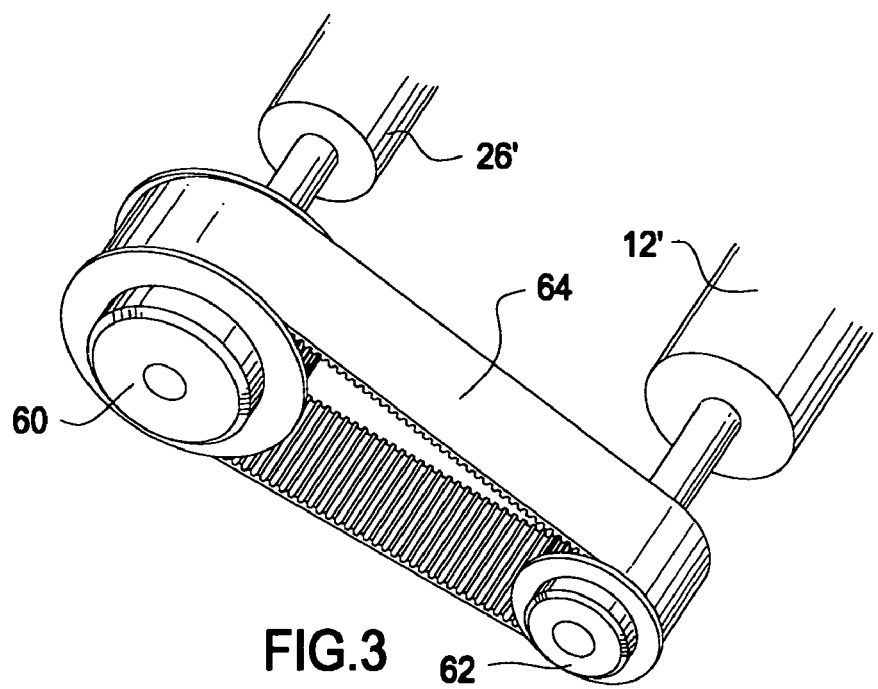
FIG. 3 is a partial cutaway perspective view of a contemplated alternative drive arrangement for the pinch valve of the present invention.

FIG. 3 illustrates one possible example of using a belt 64 to operatively couple the valve actuator 12' to the pinching extension 26' (both the actuator and pinching extension being shown schematically). More specifically, the actuator gear 14 and gear wheel 16 of FIG. 1 and FIG. 2 have been replaced by an actuator pulley 62 and a driven pulley 60, which are connected through the use of belt 64. It is contemplated that this configuration works in a manner that is commonly understood in the art, and that belt 62 may be any of the commonly known belt types, including but not limited to, flat belts, v-belts, multi-v belts, and synchronous or cogged belts. Similarly, the actuator pulley 62 and the driven pulley 60 could be configured in an appropriate manner to correspond with the chosen belt type, as is commonly understood in the art. FIG. 3 illustrates but one contemplated configuration utilizing a synchronous belt to operatively couple the valve actuator 12 to the pinching extension 26, however all possible configurations utilizing a belt are contemplated in this disclosure.

Figure 4:
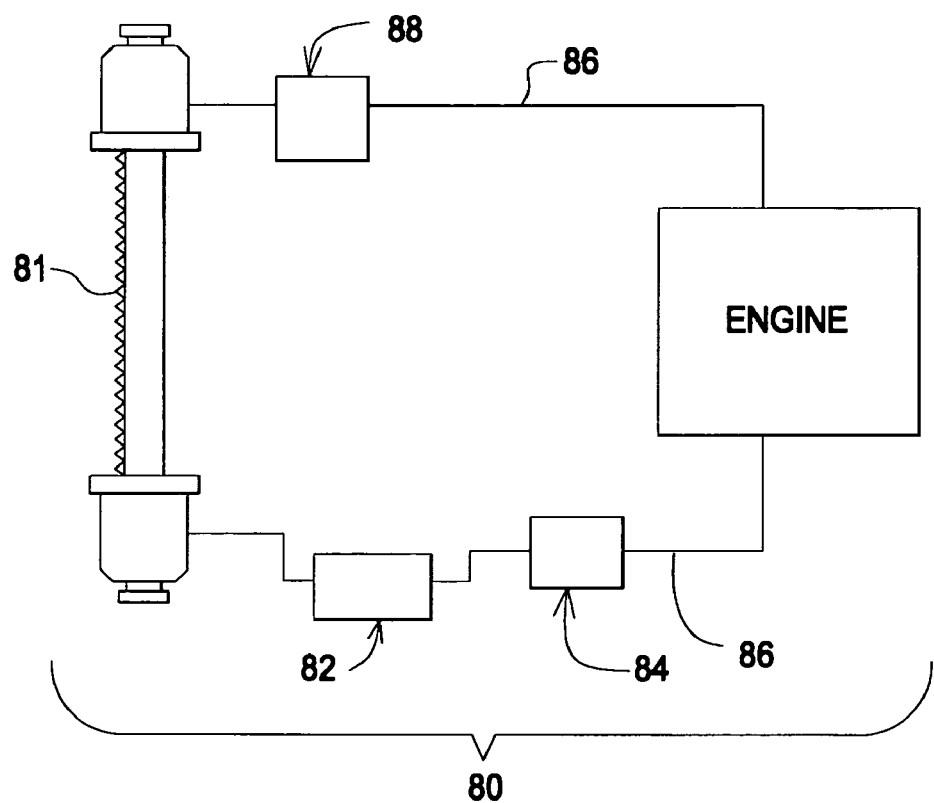
FIG. 4 is a block diagram of motor vehicle cooling system comprising a pinch valve of the present invention.

FIG. 4 illustrates a block diagram of a typical automotive cooling system comprising a pinch valve of the present invention. The cooling system (shown generally at 80) comprises a radiator 81, a pinch valve of the present invention 82, a fluid pumping mechanism 84, a fluid reservoir 88, and a hose network 86 connecting the components of the cooling system, and typically running through an associated engine that is to be cooled. Cooling systems for motorized vehicles are commonly understood in the art, and may be of various configurations and include additional components, all of which are contemplated in the present disclosure. Typical automotive cooling systems comprise a thermostat valve to control the flow of fluid, typically coolant, through the hose network. However, the present invention contemplates replacing the thermostat valve with a pinch valve, and operating the pinch valve through utilization of the automobile's computer to act in a predetermined manner as a thermostat valve. It is also contemplated that the pinch valve of the present invention could work in conjunction with a typical thermostat valve as well, although this configuration would not apparently be as efficient. Additionally, it is contemplated that the pinch valve of the present invention may be utilized in other automotive systems including, but not limited to, the braking system and the fuel system, and is not limited to only the cooling system.

Although a specific preferred embodiment has been described with reference to the accompanying drawings herein, it is to be understood that the invention is not limited to that precise embodiment, and that various changes and modifications may be effected by one skilled in the art without departing from the scope or spirit of the invention as defined in the appended claims. Moreover, the invention illustratively described herein may be practiced in the absence of any element that is not specifically disclosed herein.

What is claimed is:

1. A pinch valve for a motorized vehicle comprising:
   a flexible hose;
   an extension seat cradling said flexible hose;
   a pinching extension aligned opposite said extension seat on the outside of said flexible hose, said pinching extension disposed to extend toward and retract from said flexible hose; and
   a valve actuator operatively coupled to said pinching extension through at least one gear.

2. The pinch valve of claim 1, wherein said valve actuator is an electric motor.

3. The pinch valve of claim 1, further comprising:
   a control system operatively coupled to said valve actuator.

4. The pinch valve of claim 3, wherein said control system is a vehicle's computer.

5. The pinch valve of claim 1, further comprising:
   a housing encompassing said pinching extension and extension seat.

6. The pinch valve of claim 1, wherein said flexible hose is comprised of ethylene propylene diene monomer.

7. The pinch valve of claim 1 further comprising
   a gear axle operatively coupled to said pinching extension; and
   a valve actuator operatively coupled to said gear axle.

8. The pinch valve of claim 7, further comprising:
   a control system operatively coupled to said valve actuator.

9. A cooling system for a motorized vehicle, said cooling system comprising:
   a radiator;
   a fluid reservoir;
   a hose network connecting said fluid reservoir to said radiator;
   a fluid pumping mechanism, positioned along said hose network; and
   a pinch valve positioned along said hose network, said pinch valve comprising:
      a flexible hose forming part of said hose network;
      an extension seat cradling said flexible hose;
      a pinching extension aligned opposite said extension seat on the outside of said flexible hose, said pinching extension disposed to extend toward and retract from said flexible hose; and
      a valve actuator operatively coupled to said pinching extension.

10. The cooling system of claim 9, wherein said valve actuator is operatively coupled to said pinching extension through at least one gear.

11. The cooling system of claim 9, wherein said valve actuator is operatively coupled to said pinching extension through at least one belt.

12. The cooling system of claim 9, wherein said valve actuator is operatively coupled to said pinching extension through at least one chain.

13. A method for controlling the flow of material through a hose network containing a flexible hose and a hose pinching extension located on a motorized vehicle, said method comprising the steps of:
   receiving data from an input sensor;
   comparing the data to a predetermined control directory forming part of a control system located on the vehicle;
   sending a directive to a valve actuator in response to the comparing of the data to the predetermined control directory;
   actuating the pinching extension in response to the directive; and
   extending the pinching extension toward or retracting the pinching extension away from the flexible hose in response to the actuation.

14. The method of claim 13 wherein said valve actuator is an electric motor.

15. The method of claim 13 wherein said control system is a vehicle's computer.

* * * * *